United States Patent
King, V et al.

(10) Patent No.: US 11,212,202 B2
(45) Date of Patent: Dec. 28, 2021

(54) NETWORK PERFORMANCE ENHANCEMENT SYSTEM

(71) Applicant: Subspace Inc., Playa Vista, CA (US)

(72) Inventors: William Emmett King, V, Playa Vista, CA (US); Charlie Frederick Hulcher, Bellevue, WA (US)

(73) Assignee: Subspace Inc., Playa Vista, CA (US)

( * ) Notice: Subject to any disclaimer, the term of this patent is extended or adjusted under 35 U.S.C. 154(b) by 0 days.

(21) Appl. No.: 17/225,951

(22) Filed: Apr. 8, 2021

(65) Prior Publication Data

US 2021/0320854 A1    Oct. 14, 2021

Related U.S. Application Data

(60) Provisional application No. 63/007,227, filed on Apr. 8, 2020.

(51) Int. Cl.
*G06F 15/173* (2006.01)
*H04L 12/26* (2006.01)
*G06N 7/00* (2006.01)

(52) U.S. Cl.
CPC .......... *H04L 43/062* (2013.01); *G06N 7/005* (2013.01); *H04L 43/0817* (2013.01); *H04L 43/0852* (2013.01); *H04L 43/0882* (2013.01); *H04L 43/0888* (2013.01)

(58) Field of Classification Search
CPC .............. H04L 43/062; H04L 43/0882; H04L 43/0817; H04L 43/0852; H04L 43/0888; G06N 7/005

See application file for complete search history.

(56) References Cited

U.S. PATENT DOCUMENTS

| | | | |
|---|---|---|---|
| 8,189,489 B2 | 5/2012 | Zhang et al. | |
| 8,688,827 B2 | 4/2014 | Gonzalez-Banos et al. | |
| 8,825,820 B2 | 9/2014 | Gerber et al. | |
| 10,404,827 B2 | 9/2019 | Evens et al. | |
| 10,700,964 B1 | 6/2020 | Yuan | |
| 10,735,268 B2 | 8/2020 | Strom et al. | |
| 2003/0086422 A1* | 5/2003 | Klinker | H04L 29/06 370/389 |
| 2017/0310595 A1* | 10/2017 | Avidar | G06Q 10/047 |
| 2019/0327336 A1 | 10/2019 | Evens et al. | |
| 2020/0169613 A1 | 5/2020 | King et al. | |
| 2020/0328965 A1 | 10/2020 | Yuan | |
| 2020/0374200 A1 | 11/2020 | Strom et al. | |
| 2021/0134418 A1* | 5/2021 | Frieder | G16H 50/20 |

* cited by examiner

*Primary Examiner* — Anh Nguyen
(74) *Attorney, Agent, or Firm* — Rowan TELS LLC

(57) ABSTRACT

A system to analyze and improve network traffic latency in networks including at least one IP Anycast network, based on first derivative graphs generated from directed acyclic graphs generated at periodic intervals for end user devices and network servers. The first derivative graphs are reduced to a best-performance path and applied to make application-specific data routing changes in the network.

11 Claims, 7 Drawing Sheets

… (1)

NETWORK PERFORMANCE ENHANCEMENT SYSTEM

CROSS REFERENCE TO RELATED APPLICATIONS

This application claims priority and benefit under 35 USC 119(e) to U.S. application Ser. No. 63/007,227, titled "NETWORK PERFORMANCE ENHANCEMENT SYSTEM", filed on Apr. 8, 2020, the contents of which are incorporated herein by reference in their entirely.

BACKGROUND

Games or other online applications may interact across large geographic regions, routing network traffic from wherever the end user (e.g., gaming) machines are located to wherever the application (e.g., game) server is located. Such applications may have different logic architectures and may generate different traffic behavior.

Prior approaches to improving the performance of such diverse online applications include VPNs, custom APIs, and try CDNs. These prior approaches generally do not provide the necessary performance for modern applications at large scales or require modification of the application architecture.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
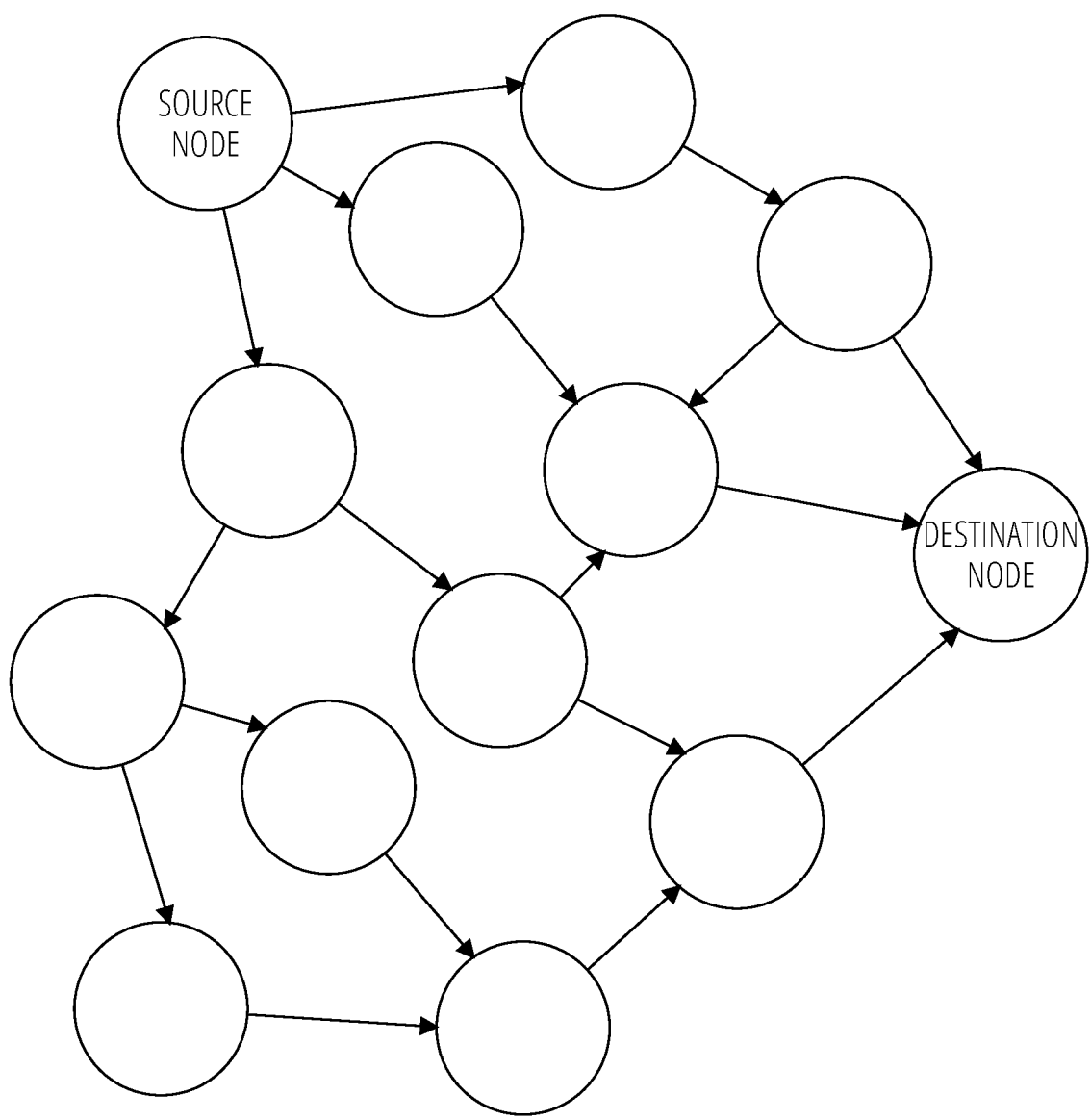
FIG. 1 depicts an exemplary directed acyclic graph.

Certain terms used in this disclosure should be understood as follows.

"ACK" refers to a general acknowledgement of receipt message passed between components in or over a communication network.

"Datagram" refers to a basic transfer unit in a packet-switched network. Each datagram has two components, a header and a data payload. The header contains information for routing the datagram from the originator device to the endpoint device. Headers may include originator and endpoint addresses as well as a type field. The payload is the data to be transported.

"Endpoint" refers to a receiver device referenced by the destination address in a data packet. An endpoint is not necessarily the final destination of a packet. For example an endpoint may be the target media destination (deleted) of the packet or an intermediate network component such as a network router, relay server (deleted), switch, or other device that alters the destination address in the packet to a next hop address or to the target media destination (deleted) address.

"First derivative graph" refers to graphs in which the edge weights characterize a rate of change of an edge characteristic. First derivative graphs are thus derived from two or more time snapshots of the edge characteristic. For example, a first derivative graph may comprise edges weighted by the rate of change of latency and/or traffic and/or congestion on the path segments of the graph.

"Geographic proximity", relative to a network node, refers to location within a configured geographical boundary (geoboundary) comprising the network node.

"Hub" refers to a common connection point at junctions in a network. For example hubs connect different segments of a network at multiple ports so that when a packet arrives at one port, it is copied to the other ports so that all segments of the network carry all packets.

"IP Anycast" refers to a network addressing and routing technology in which a single destination address has multiple routing paths to two or more endpoints. Network routers select the routing path on the basis of factors such as number of hops, distance, lowest cost, and latency measurements, or based on the least congested route. IP Anycast addressing is a one-to-one-of-many association whereby datagrams are routed to any single endpoint of a group of potential endpoints that are all identified by the same destination address. The IP Anycast routing algorithm selects the single endpoint from the group based on least-expensive routing metrics.

"IP Unicast" refers to a network addressing and routing technology in which a single destination address is uniquely associated with an endpoint. IP Unicast addressing uses a one-to-one association between an originator and an endpoint: each destination address uniquely identifies a single endpoint.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Lower-latency path" refers to paths or path segments comprising a latency meeting or below a configured threshold level.

"Media content" refers to any digital data. Video, audio, and interactive gaming data are examples of media content.

"Multilateration" refers to any algorithm of the family of well-known algorithms for determining a network device's physical location to a configured accuracy based on measurement of the times of arrival (TOAs) of packets having a known range of propagation values from and to (typically) multiple known locations. The known locations may utilized synchronized clocks.

"Network path" refers to a path between two nodes in a directed acyclic graph. A network path comprises one or more path segments.

"Network routing application" refers to a network routing control (deleted) implemented as application logic.

"Networking layer" refers to logic utilized in networked devices providing the functional and procedural mechanisms to communicate packets from one network device to another, wherein each network device is typically associated with a network address, although not necessarily uniquely so. The networking layer may implement message delivery by splitting large messages into many packets or datagrams at one node, sending the fragments independently, and reassembling the fragments at another node. It may, but does not need to, report delivery errors. The networking layer is referred to as "Layer 3" in some implementations.

"Originator" refers to a device originating a datagram or packet on a network.

"Packet" refers to a unit of communication over packet-switched networks, comprising control information and data known as the payload. Control information controls delivery of the payload. Examples include originator and endpoint network addresses, error detection codes, and sequencing information. Typically, control information is found in packet headers and trailers. Large packets may comprise multiple datagrams.

"Path segment" refers to a subset (one or more) edges that make up a network path in a directed acyclic graph.

"Point-of-presence" refers to an interface point between endpoint and originator devices and a network such as the Internet. An Internet point-of-presence (PoP) provides a local access point through an Internet Service Provider (ISP). A PoP typically comprises servers, routers, network switches, multiplexers, and other network interface equipment, and is often located in a data center. ISPs typically provide multiple PoPs to their customers.

"Real-time media content" refers to audio, video, interactive teleconference data, interactive online gaming, and other digital content communicated over a network between an upstream media source and a target media destination and which requires accurate delivery to the target media destination in accordance with a timebase such that the experience or interactivity of the content is not compromised at the target media destination.

"Ripple effect" refers to network traffic effects induced by a change in network traffic on a target path or path segment, such that the change induces traffic and/or latency changes in other paths or segments, which may in turn induce changes back into the target path or segment, and so on.

"Router" refers to a device utilized to forward packets between at least two networks, for example between a private network and the Internet or the Internet and a telecom network. Routers are located at gateways, the devices where two or more networks connect. Routers use headers and forwarding tables to determine the best path for forwarding the packets between networks, and they use protocols to communicate with each other and configure the best route between endpoint devices on the networks.

"SSSP pathfinding" refers to any algorithm in the well-known family of Single Source Shortest Path algorithms for locating a shortest path through a graph based on one or more selected criteria. Typically, a graph is provided to the SSSP pathfinding algorithm comprising a set of vertices (nodes) and edges, where the edges are assigned weights representing a physical characteristic of the connection between vertices (e.g., latency). The SSSP pathfinding algorithm then determines a path between two selected vertices that minimizes the overall weight, for example.

"Switch" refers to a device that filters and forwards packets between network segments. Switches operate at the data link layer (layer 2) and sometimes the networking layer (layer 3) of the OSI Reference Model and therefore support any packet protocol. Networks that use switches to join segments are called switched networks.

"Synthetic network traffic" refers to packets, datagrams, or other network signals injected into the network by devices (synthetic POPs and synthetic servers) configured to simulate or mimic the behavior of endpoints or servers, or to simply provide network traffic for purposes of latency measurements.

"Target" refers to the intended final recipient/consumer of a packet from an originator. The target is distinguished from an endpoint generally in that an endpoint may be an intermediate destination through which a packet is routed in a network, vs being the target or final intended destination of the packet.

"Target media destination" refers to the target specified by an upstream media source for receipt of media content.

"Threshold latency derivative" refers to configured setting(s) for a derivative value that determines whether or not a corresponding graph edge is pruned.

"Trace route" (also "traceroute") refers to logic (e.g., the TCP/IP Traceroute utility, the Mac OS X Network Utility) that traces an overall network connection from one location to another, recording hops along the way. For example in some systems a trace route may be executed by typing tracert [domain name], where [domain name] is either the domain name or the IP address of the system to reach.

When a trace route is executed, it returns a list of network hops (e.g., host name and IP address) for each network location to location connection. It also typically returns the amount of time (latency measurement) it took for each connection to take place (usually in milliseconds). This shows if there were any delays in establishing the overall connection. Therefore, if the overall network connection is slow or unresponsive, a trace route provides details on where and to what extent the latencies exist.

"Upstream media source" refers to a supplier of network traffic in a directed acyclic graph. An upstream media source may original the network traffic or may be an intermediate node in the graph that forwards traffic from a prior node (prior in the direction of the network traffic).

Embodiments of network architectures and network routing algorithms are herein disclosed for improving the performance of real-time online applications such as multiplayer competitive gaming and teleconferencing. The disclosed mechanisms are independent of the application architecture and may operate independently of, or supplement, conventional approaches. Examples are provided and described herein primarily in the context of online gaming. However it should be understood that the disclosed mechanisms are not limited to use with online games.

Online gaming networks may be conceptually divided into middle, last, and long mile. In such networks the gaming machines games may be located far from game servers, such that the latency of network packets becomes impactful on game performance and experience. For example, gamers in Seattle, Tacoma, Olympia, Wash., and Vancouver, BC, may all be participating in an online game hosted on a server in Portland, Oreg. The network route for game traffic for those gamers, who are all approximately in a linear physical path with one another, may not be linear at all. For example 50% to 80% of their game machine traffic may take a circuitous route through Yakima, Wash. or Boise, Id. or Salt Lake City, Utah to or from the game server in Portland.

Latency measurements on the network paths between the game machines and game server(s) are made using real-time telemetry. The latency measurements may be for actual application traffic or for synthetic network traffic generated using synthetic POPs or synthetic servers. The latency measurements may be made for multiple (e.g., hundreds, thousands, possibly millions) active gamers at once, at regular intervals (e.g., every few seconds to few minutes). The network performance is analyzed from game machine locations to the game servers they utilize, and vice versa. Directed acyclic graphs are generated in a low latency manner from each active gamer (or simulated gamer) location to each game server location, and vice versa. Optimal performance paths are identified from a time derivative (called the first derivative graph) of these directed acyclic graphs, for each individual active gamer.

Conventional content distribution networks (CDNs) utilize last mile performance as a primary network performance optimization factor. CDNs work to push/cache content to within the last mile of the game machines. This approach has proven insufficient for some types of network traffic generated by some online games and other online applications (including voice and video conferencing).

To reduce latency, measurements are utilized from the entire routing graph for each gamer including their actual network traffic routing and potential paths not currently utilized by their network traffic. Additional data transformations are generated to determine best path routing for a particular gamer or to optimize latency across a set of gamers. Telemetry systems may be utilized to geolocate user machines, routers etc. to within a defined area (e.g., 100 kilometers) or latency limit (e.g., 80 milliseconds). With this geographic information and latency knowledge, it may be determined if a particular route for network traffic is operating efficiently. For example, if two servers or routers are indicated with a separation of 1000 kilometers, which correlates to about 10 milliseconds of latency between one another, the route may be inefficient if the actual measured latency between those machines is 20 milliseconds. Without disruption of applications traffic in progress, the routing may be changed between those machines, for example to a physically longer (but latency shorter) route.

In some cases the geolocation of devices on the network, within a geoboundary, may be determined (inferred) from the known geolocations of other devices, and latency measurements and packet analysis (e.g., packet profiling or IP trace route analysis). This may be referred to as multilateration.

An example online scenario is one in which a person is taking part in a videoconference call. The person is utilizing a Comcast point-of-presence from an office network. The person's laptop and office network doesn't respond to a ping, so it's not known geographically where they are. But the Comcast router that's one hop into the Comcast network network from the office network does not respond to a ping. The system can determine that the caller is, for example, two milliseconds away from that router using a trace route from other network components. The system can thus determine that the person is within 200 kilometers of the Comcast router. The system can multilatrate the Comcast router and verify the location using a network operation request to identify where that router is. This constrains the Internet geography of where the person is located based on the known location of the router.

Telemetry information including geolocations and path latencies may be collected from a large set of active networks users, or simulations of network users, to many different network locations, such as to game servers. This data may be used to generate one or more directed acyclic graphs embodying network performance for each user specifically, with scored edges between nodes of the graph(s) representing network devices. The time evolution of these directed acyclic graphs may be analyzed to make network routing changes to reduce latency for specific users or groups of users.

Directed acyclic graphs (e.g., see FIG. 1) may be generated for each gamer and/or game server with edges directed from gamer to game server and from game server to gamer. First derivative graphs of the directed acyclic graphs may be input as training sets to a machine learning system to enable predictive analytics of network and application behavior. These inputs have an inherent temporal nature. For example a training set may comprise a set of first derivative graphs for users of an online game over a period of days, where the graphs are updated in second or minute increments.

In one embodiment, the directed acyclic graph for each gamer comprises two edges between each device node: one edge for traffic flows to the gamer from the game server, and one for traffic flows from the gamer to the game server. In some embodiments separate directed acyclic graphs are generated for traffic in each direction.

The evolution of first derivative graphs is evaluated. For example, the directed acyclic graphs for actual active (and/or synthetic) gamers may be regenerated (bidirectionally as explained above) every N minutes. Most of the directed acyclic graphs may not change much from interval to interval, but a subset of the directed acyclic graphs change significantly between the intervals. Clustering around the subset of substantially changing graphs may yield information about how to adapt game traffic for improved performance over time, providing a feedback mechanism for network routing changes that is both reactive and reinforcing.

In addition to real-time actual or synthetic traffic readings, the system may utilize historical directed acyclic graph evolution data to predictively improve routing of application traffic. For example the system can learn and predict ripple effects from routing changes by analyzing historical directed acyclic graphs (or first derivative graphs) for particular users and/or servers at particular times, days, etc.

Internet Service Provider and BGP (Border Gateway Protocol) level interconnects and pathfinding behave as a complex adaptive system. Therefore, there may not be a practical formulaic relationship between network changes and the traffic effects they cause. For example, bringing a data center of game servers online that's closer to a batch of users than the one they are using currently may actually increase the latency experienced by users of the game in some cases.

Instantaneous telemetry readings (those readings associated with a discrete timestamp) may be insufficient in some cases. For example, the instantaneous telemetry readings may indicate that at a given moment, re-routing a user's network traffic from path A to path B will result in improved instantaneous performance for a user playing a game on a particular server. However, at the time of day in the geographic region and for a particular game, the historical data may indicate that in a few minutes longer, path B is no longer going to be the fastest one for that user because there's a likely large change in the user base imminent in that area for that game. As another example, switching the user at that time to path B has historically shown to negatively impact a different set of users in another region or on another server in the same region, after a period of time. To prevent a double-switch (switching to path B then back to path A), the system may suppress the route switch for the user to path B even though the instantaneous data indicates it is the best one at the moment. In this manner the system also provides rerouting cascade avoidance.

Synthetic network traffic may be generated for example by injecting network traffic for a non-actual point of presence—POP—on network behavior in order to collect data about latencies when natural traffic is insufficient for this purpose. For example, the traffic on a particular network path to or from a user machine and a particular game server or teleconferencing server may be insufficient to accurately profile latency on that path. By generating synthetic traffic on the path to or from the user machines and the servers, the pace, region, time of day, time interval, configuration, and other aspects of the network traffic may be controlled.

By generating synthetic network traffic directed acyclic graphs may be constructed not only for active users and servers but also for servers the users aren't currently actively using, and for users that aren't active at the moment. These directed acyclic graphs are constructed using synthetic network traffic generated both to and from the other servers for the particular or potential users. For example, a first set of all game servers in a geographic region being actively used by a particular set of gamers, and a second set of game servers outside that region that are also being used for a specific multiplayer gaming session, may be combined into a combined set of devices that is profiled with natural and synthetic network traffic to generate directed acyclic graphs for each gamer machine in the specific multiplayer gaming session.

In one embodiment, game servers outside a defined geoboundary, or having a latency above a defined threshold from a gamer's machine, are profiled less frequently or over a longer interval than those within the geoboundary or latency threshold. For example, the system might profile game servers within a 5 millisecond latency over ten second intervals every thirty seconds, but apply a one minute profiling window every five minutes to game servers within 5+ to 10 milliseconds, and a ten minute profiling window once per day to game servers with 10+ to 50 millisecond latency. The directed acyclic graphs generated at longer intervals may include all of the lower-latency paths sampled and updated at the more frequent intervals.

Clustering and cluster reduction may be performed on the directed acyclic graphs, or the first derivative graphs, to identify areas of the network for optimization of latency. Clustering/reduction may be focused on gamers in a particular gaming session, on a particular gaming server, or in a particular geoboundary, for example. Clustering and reduction reduce the graph set to a more computationally manageable subset of gamers and game servers for optimization analysis.

Different types of directed acyclic graphs may be generated. One type of directed acyclic graph may be generated for traffic between synthetic servers (round trip or unidirectional). A second type of directed acyclic graph may be generated for traffic between gaming machines and game servers (round trip or unidirectional). A third type of directed acyclic graph may be generated for traffic between gaming machines and synthetic servers (round trip or unidirectional). A fourth type of directed acyclic graph may be generated for traffic between synthetic servers and game servers (round trip or unidirectional).

Edges in the directed acyclic graphs may be added based on IPV4 and IPV6 connectivity. Edges in the directed acyclic graphs may then be characterized by a source and destination address. A node in the directed acyclic graph may represent one device, or a set of co-located physical devices. For example, a node in the directed acyclic graph may be a data center with many servers. An edge in the directed acyclic graph then represents a data traffic path from one IP range to another IP range, where an IP range is associated with a specific physical network link at a point in time.

For example, there may be a data center located in Seattle, Wash. using five physical links on the Internet to communicate with a data center in Portland, Oreg. Each edge of the directed acyclic graph with that data center as a node is assigned with a source link and a destination link. The directed acyclic graph therefore comprises 25 edges (or 50 edges, if the directed acyclic graph is bidirectional between the locations) between those two data centers, one edge from each source link in Seattle to each destination link in Portland.

A new node is added to the ongoing directed acyclic graph generation for a gamer or game server when a new network device (gaming machine, server, data center, router etc.) is detected as coming online. Multilateration and metadata generation/collection for the new node may be initiated upon detecting it.

Bidirectional directed acyclic graphs for each gamer and game server may be regenerated periodically over fixed time intervals, and their time evolution analyzed to learn and implement routing changes that improve latency. The directed acyclic graphs are clustered and reduced using techniques known in the art.

Clustering is useful to identify different types of network behaviors with different effects over different time intervals. For example, when a router is brought online, it usually has a measurable effect on network traffic latency in a short (e.g., two or three minute) time interval after coming online. After that, the router continues to have an effect over a longer period (e.g., the next half hour to an hour), but it's a more subtle effect than the initial one. There are transient effects to new nodes coming online, and there's also long term effects, and clustering may help reveal them.

There are also ripple effects to network device changes. For example, when one Internet Service Provider reconfigures one of their routers, that impacts the behavior of other Internet Service Provider that they interact with. When those other Internet Service Provider detect their traffic profile shift, their routers react. The result is a cascading adaptive system effect. By forming, reducing, clustering, and analyzing the directed acyclic graphs over a fixed interval for a configured number of intervals, these cascades may be detected and mitigated or otherwise accounted for to improve or predict effects on latency.

Latency metrics to associate with each edge of the graph may include minimum latency, maximum latency, average latency, loss factor, and jitter. Any or all of these parameters may also be classified according to their percentile in the distribution of edges in the graph. For example, any of these metrics may be classified as being in the $10^{th}$ percentile, $25^{th}$ percentile, $50^{th}$ percentile, or $90^{th}$ percentile for a given path or path segment in the graphs. Some metro areas may have a tight cluster of gamers where everybody is within a certain communication latency of one another. Cities that are more rural may have a broader range of latency. The geoboundaries of the graphs may be adjusted based on the statistical percentiles of their edges.

Nodes of the directed acyclic graphs may be labeled with a location and/or a multilaterization metric of geographic proximity. The metric may indicate a geographic distance x from a node to neighbor nodes.

"Single source shortest path" (SSSP) analysis may be performed to generate a sorted set of candidates for data traffic paths with a weight applied to each of the paths based on the path latency. Latency and other potentially other scoring metrics are thus factored into the weight for the paths. Attributes of the edges and nodes between nodes may be aggregated to generate aggregate metrics for the paths through the directed acyclic graphs, with SSSP pathfinding and ordering applied to produce a sorted set of edges or paths.

Applying the ordered set of edges and/or paths in the clustered set of directed acyclic graphs (where the ordering is based on first-derivative scoring), the system may perform a regional optimization on the latency of gamers in a defined geoboundary utilizing a particular game server. For example, all gamers playing on a particular game server in Frankfurt, Germany, may have their traffic patterns to and from the game server balanced to approximately (within a configurable tolerance) the same latency (c0mpensating for geographic distances).

The directed acyclic graphs are periodically regenerated over a fixed empirical sampling window. Over a certain number of such sampling windows, a differential (first derivative graph) is computed between the graphs, representing a change of performance over time for the region, user, or server that is the subject of the graph. Clustering and reduction of paths and nodes is performed on the first derivative graphs generated in this manner. Aggregate graph parameters may then be determined across clusters of users, servers, etc. for time intervals of interest. Examples of an aggregate parameters are aggregate latency for a particular game server, data center, geographic region, etc. across clusters of players over a particular time interval.

For reduction/pruning of the graphs, a threshold latency derivative may be applied to graph edges. On condition that the latency derivative (a metric of performance stability) of an edge falls within an assigned range, the edge may be removed from the graph or otherwise ignored for analysis purposes. This provides a mechanism for coarse-graining the graphs to improve the analytical bandwidth (e.g., refresh rate of the graphs in time).

The system may map IP ranges to cities, states, countries, or other geographic regions. The IP ranges are mapped to gamers, POPs, game servers, routers, and data centers. The location of some network devices may be known from installation records whereas the location of others may be inferred using trace routes and multilateration of traffic between devices of known location.

Network configuration, network device hardware status (e.g., working or not, congested or not), network routing (to and from traffic patterns for network devices) and IP configuration may in this manner be measured repeatedly at points in time to generate a sequence of graphs.

When using IP Anycast, a data center or other device may configure and announce an IP block. A data center or device that announces IP block, even if that data center or device is not receiving traffic, can influence traffic patterns of other data centers or devices that are also announcing the same block.

For example, if a data center in Seattle is using a particular IP block range for proxy services, and if a data center in Sydney Australia starts announcing that same IP block range, even if no device is currently sending any traffic to Sydney, that Sydney announcement may still influence the Seattle traffic patterns.

By analyzing the sequence of graphs thus generated the network performance evolution, both to and from devices, network performance may be evaluated and used for machine learning and network routing improvement. The time derivative of the graphs provides a quantified error function for the learning and improvement. The error function may embodiment an amount of latency improvement that can be achieved by routing changes at points in time, and at what time to make those changes. The graph evolution thus provides a form of competitive analysis for different paths in the network for each gamer at each point in time.

In one embodiment path segments of the first derivative graphs may each be assigned an associated performance metric P based on one or more telemetry readings each taken in different sampling intervals, as follows:

$$P = \alpha \nabla_{lo} + \beta \nabla_{la}$$

Here $\alpha$ and $\beta$ are weighting factors and $\nabla_{lo}$ and $\nabla_{la}$ are instantaneous rates of change in the loss and latency of the path segment, respectively. The weighting factors may be adjusted based on the emphasis to place on loss and latency for the type of application that is communicating data over the path segment. For example, some types of applications may be highly sensitive to loss but may tolerate latency to some extent, and vice versa.

In one variation, the rates for loss and/or latency may be taken as absolute values in the determination of P. The sampling interval may, in one embodiment, be set to meet or exceed the Nyquist frequency of a configured rate at which to potentially make routing changes for data on the network. For example, if routing changes are to be (if needed) made every 60 seconds, them real-time telemetry for loss, latency, etc. on the path segments may be performed every 30 seconds, or more frequently than that.

The stability of the loss and/or latency may also be tracked. In one embodiment the stability of a particular path segment characteristic is determined by assigning a signed value to the characteristic, and accumulating the signed value over time. For example given three sampling intervals, if the instantaneous loss on a path segment is positive (increasing loss trend) over the first two intervals but negative over the second two intervals, then the two trends may cancel out and the loss on the path segment may be stable. Stability may be determined over any number of sampling intervals as appropriate for the application. Stability factors may thus be introduced into the algorithm for determining performance of a path segment, for example:

$$P = \alpha \nabla_{lo} + \beta \nabla_{la} + \gamma S_{lo} + \delta S_{la}$$

Here S is a path segment (also called "link stability") algorithm, many of which are known in the art, and which may be different for loss ($S_{lo}$) and latency ($S_{la}$). The parameters $\gamma$ and $\delta$ are weights. The stability function S may also vary based on the nature of the path link or network topology, again as known in the art.

In some embodiments, the performance metrics for path segments may be determined based on a rate of change of the link stability, for example:

$$P = \alpha \nabla_{lo} + \beta \nabla_{la} + \gamma \nabla(S_{lo}) + \delta \nabla(S_{la})$$

Figure 2:
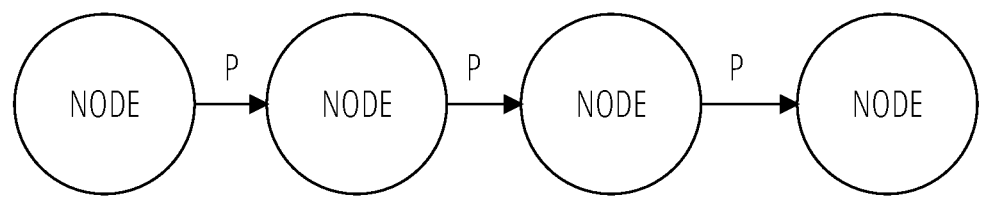
FIG. 2 depicts an exemplary graph reduction.

In each case, a lower value of P for a path segment indicates higher performance, and typically makes the path more desirable for routing. Thus the first derivative graphs may each be reduced to a single path over which the overall (accumulated path segment values of) P are lowest. For an example of a reduced graph, see FIG. 2.

The directed acyclic graphs (and thus the first derivative graphs) may be generated based on geographic regions (geoboundaries) configured specifically and differently for different applications (gaming, teleconferencing, etc.). The geoboundaries may be configured to overlap at areas of high extant traffic for particular applications, and/or areas known from historical data to be opportunities for routing particular types of application traffic on certain dates, time of day, etc.

Figure 3:
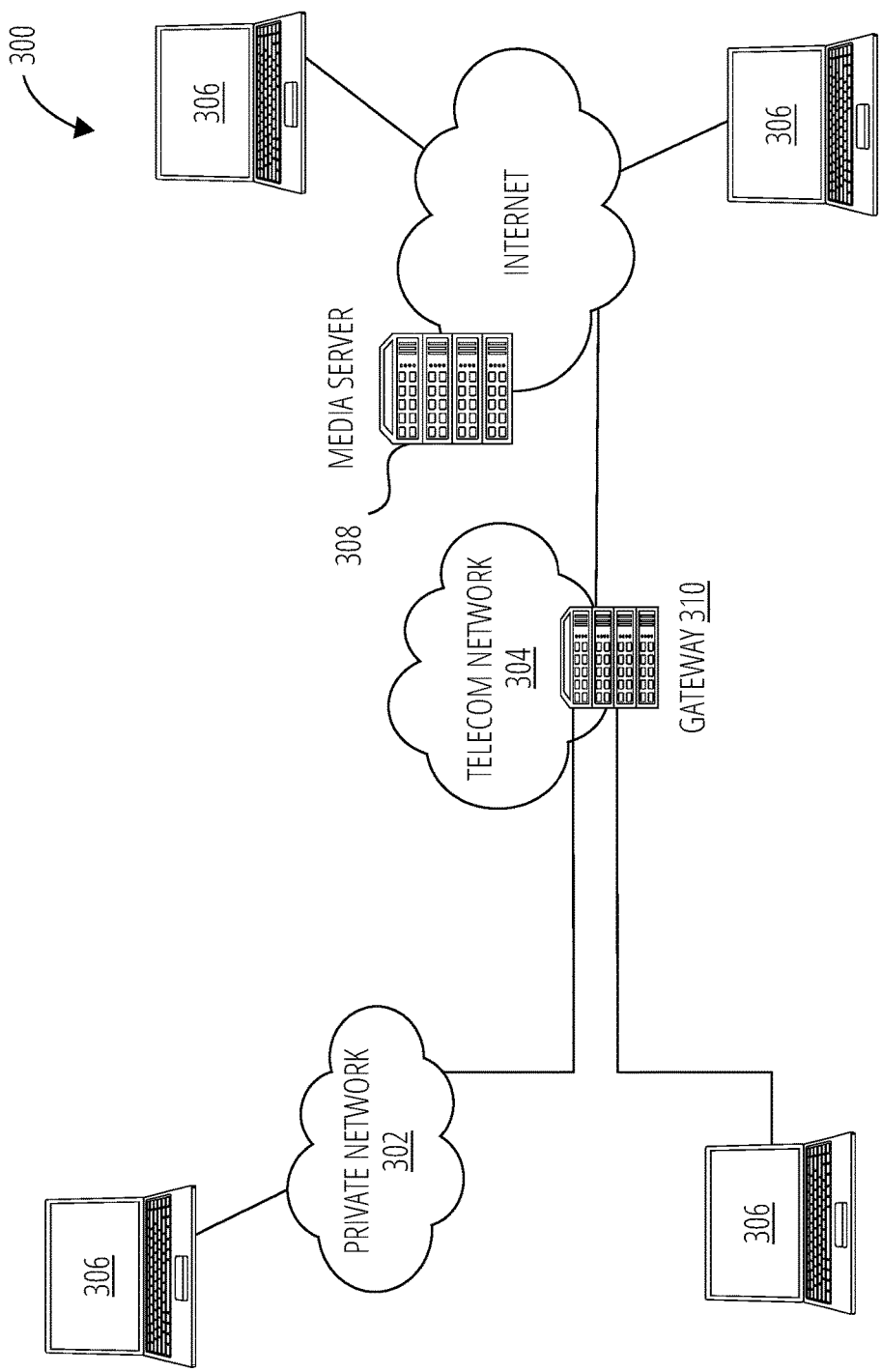
FIG. 3 depicts a network architecture 300 in accordance with one embodiment.

FIG. 3 depicts a network architecture 300 in accordance with one embodiment. The network architecture 300 in this example includes sub-networks comprising a private network 302, telecom network 304, and the Internet. A number of user devices 306 communicate with one another using the network architecture 300, for example to engage in interactive online gaming or voice/video conferencing. Any of the user devices 306 may act as an originator and/or target of media content. In a typical scenario one of the sub-networks within the overall network architecture 300 comprises a media server 308 (usually more than one) to coordinate the distribution of the media content among the user devices 306. Each of the sub-networks typically includes many other well known components that are not depicted for simplicity of illustration. These components include routers, hubs, switches, storage systems, and the like. The sub-networks may be interfaced to one another using components such as a gateway 310.

In the depicted example the telecom network 304 will typically utilize many gateways each providing a point-of-presence to the Internet or another network. The gateway 310 typically functions as a router, which directs packets that arrive at the gateway 310, and as a switch, furnishing the actual path in and out of the gateway 310 for packets.

The private network 302 and the Internet in this example may operate as IP Unicast networks, whereas the telecom network 304 may operate as an IP Anycast network.

Figure 4:
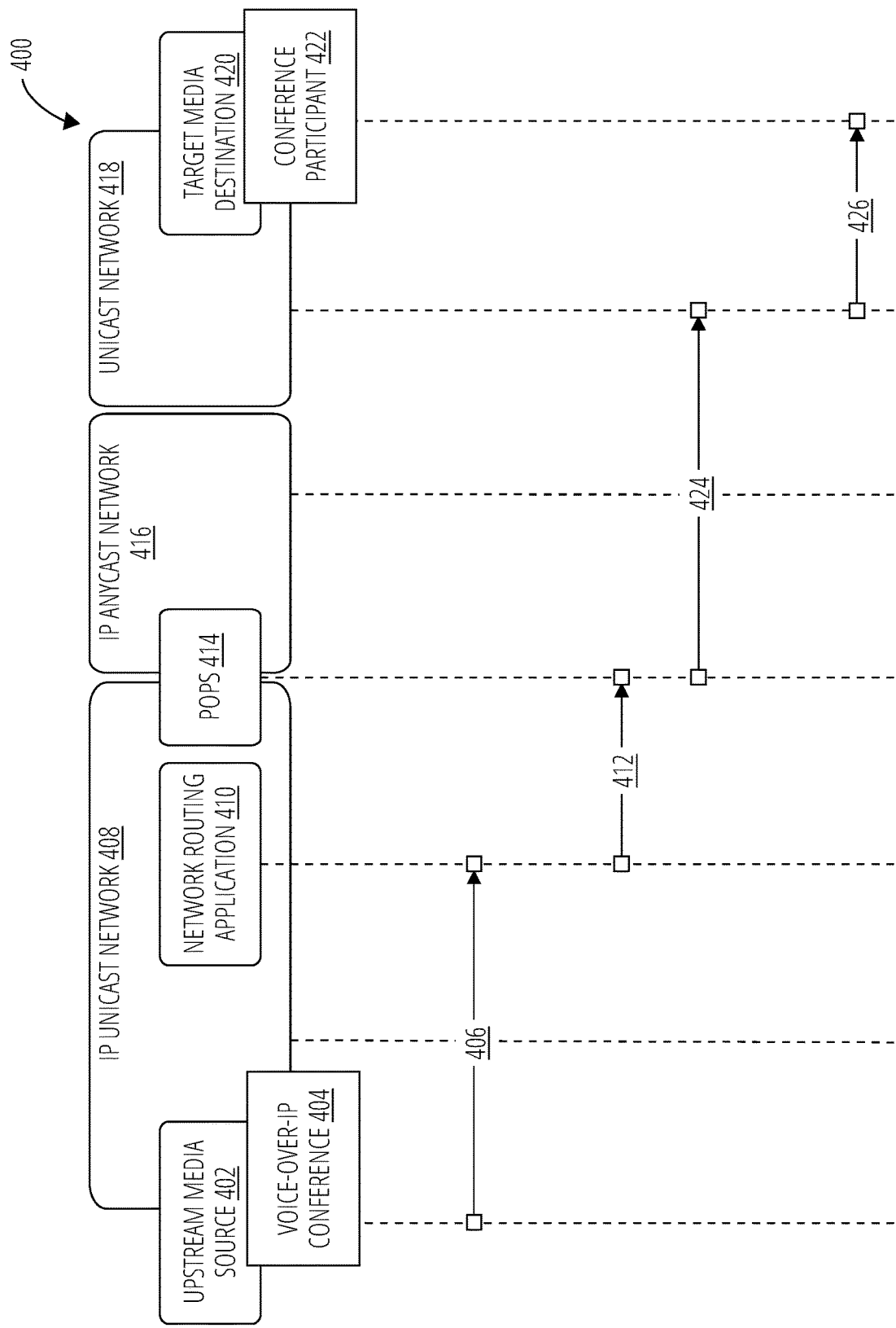
FIG. 4 depicts a media content transmission process 400 in accordance with one embodiment.

FIG. 4 depicts media content transmission process 400 in accordance with one embodiment. An upstream media source 402, such as a voice-over-IP conference server or gaming server, acts as an originator of time-sensitive real-time media content, such as a combined audio and video stream from multiple participants of a teleconference (the server originates the combined stream, not individual streams from user devices). In this scenario the upstream media source 402 intermediates between user devices in an audio/video teleconference or interactive game, for example.

The real-time media content in audio/video teleconferences is time-sensitive in the sense that should a portion of the data be lost due to a failure in the network, recovery cannot be made, as the delayed data is significantly reduced in usefulness; for example, media content comprising a voice-over-IP conference 404 stream will, if lost from the meeting, not be recoverable as useful data once that portion of the meeting is past. Furthermore, real-time media content is highly sensitive to network traffic latency.

Media content 406 may be communicated from the upstream media source 402 over an IP Unicast network 408 via a network routing application 410. This network routing application 410 may route the media content 412 to one of the points-of-presence 414 to the IP Anycast network 416. The network routing application 410 may comprise logic to implement aspects of the techniques described herein, as will be discussed further below.

The points-of-presence 414 act as a gateway for the media content traffic between the IP Unicast network 408 and an IP Anycast network 416. The IP Anycast network 416 makes the points-of-presence 414 appear as a single virtual server with a common IP address to devices communicating over the unicast network 418. If a specific POP experiences a failure or outage media content can continue to flow between the upstream media source 402 and the target media destination 420 (e.g., a conference participant 422) using the same IP address without reconfiguration of the applications (e.g., games, conferencing applications) on these devices.

This may be accomplished by maintaining server states and networks states such that each of the points-of-presence 414 can be assigned to any of the address translations the IP Anycast network 416 will be expected to handle, in addition to an assigned set of translations a specific POP will be expected to perform. Thus each of the points-of-presence 414 may be take over translation typically handled by any other POP that happens to fail, and may be able to notify the network routing application 410 of unexpected translation requests.

The media content 424 received by a POP may be communicated over the IP Anycast network 416 to a unicast network 418. From there the media content 426 may flow to the target media destination 420, such as the conference participant 422. The target media destination 420 may return an acknowledgement (ACK) to the particular one of the points-of-presence 414 that was the originator endpoint of the media content 426.

Figure 5:
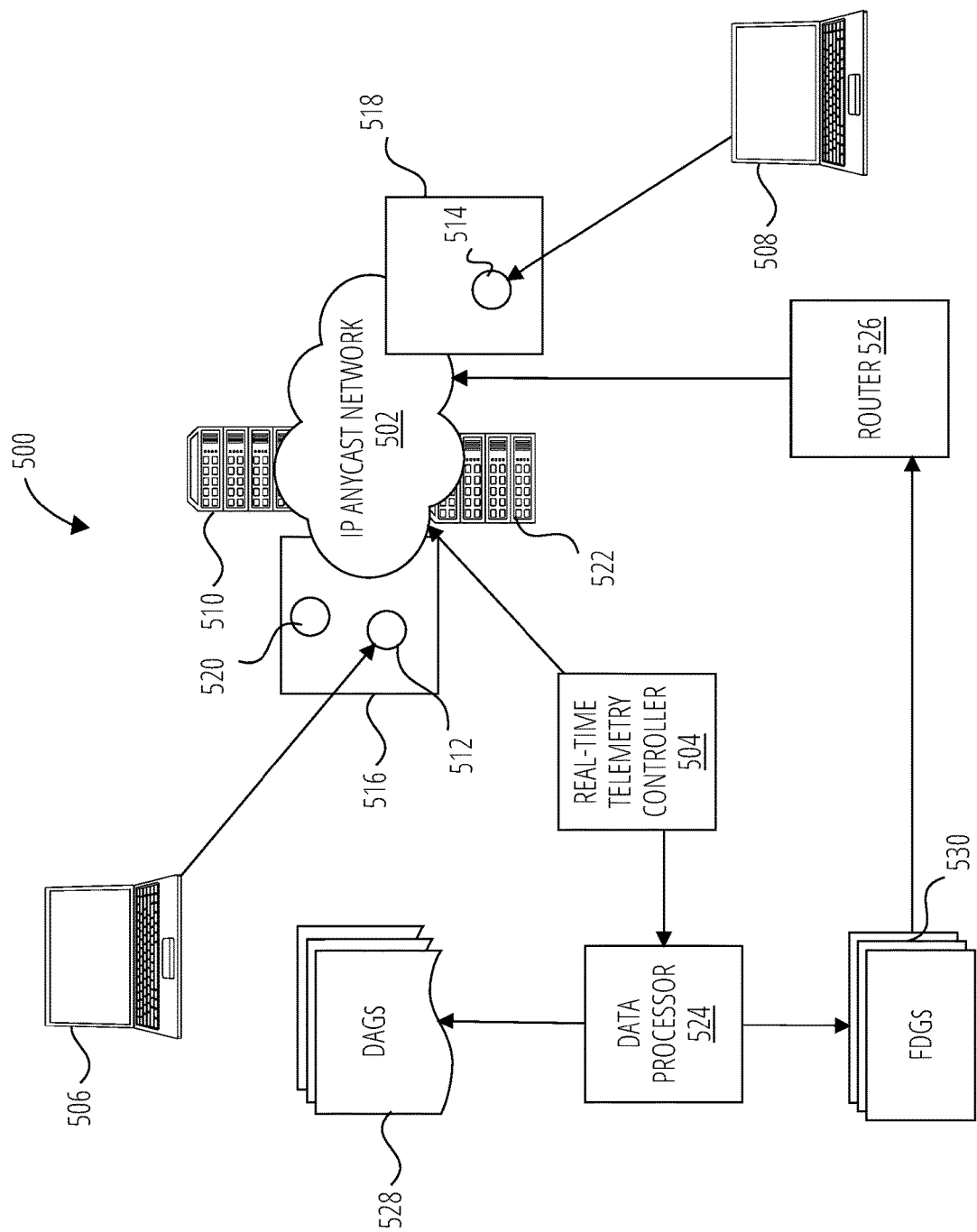
FIG. 5 depicts a network analyzer system 500 in accordance with one embodiment.

FIG. 5 depicts a network analyzer system 500 in one embodiment. The network analyzer system 500 comprises an IP Anycast network 502, a real-time telemetry controller 504, and various gaming machines (gaming machine 506, gaming machine 508) engaged in real-time online activity via a game server 510. The gaming machines access the IP Anycast network 502 via points-of-presence (point-of-presence 512, a point-of-presence 514) provided by Internet Service Providers (Internet Service Provider 516, Internet Service Provider 518). The real-time telemetry controller 504 measures natural network traffic generated by the real-time online activity generated by the gaming machines. Synthetic network traffic is also generated by a synthetic POP 520 and a synthetic server 522. The natural network traffic and the synthetic network traffic measured by the real-time telemetry controller 504 are provided to a data processor 524 (e.g., utilizing the network routing application 410 for application layer routing, or by one or more router 526 or switches for network layer routing) that utilizes generated directed acyclic graphs 528 and first derivative graphs 530 for the network traffic to and from the game server 510 and each of the gaming machines.

The "router 526" depicted in FIG. 5 may typically represent the configured destination node to route the network traffic to at each node in the selected path from source to destination gaming machines (for example), and more generally the configured routing destinations between endpoints of any path segment in the IP Anycast network 502.

There would typically be many game servers, many more gaming machines, points-of-presence etc. In the network analyzer system 500. More than one real-time telemetry controller 504 may typically be utilized. There may typically be unicast networks involved in the network traffic in addition to one or more IP Anycast network 502.

Figure 6:
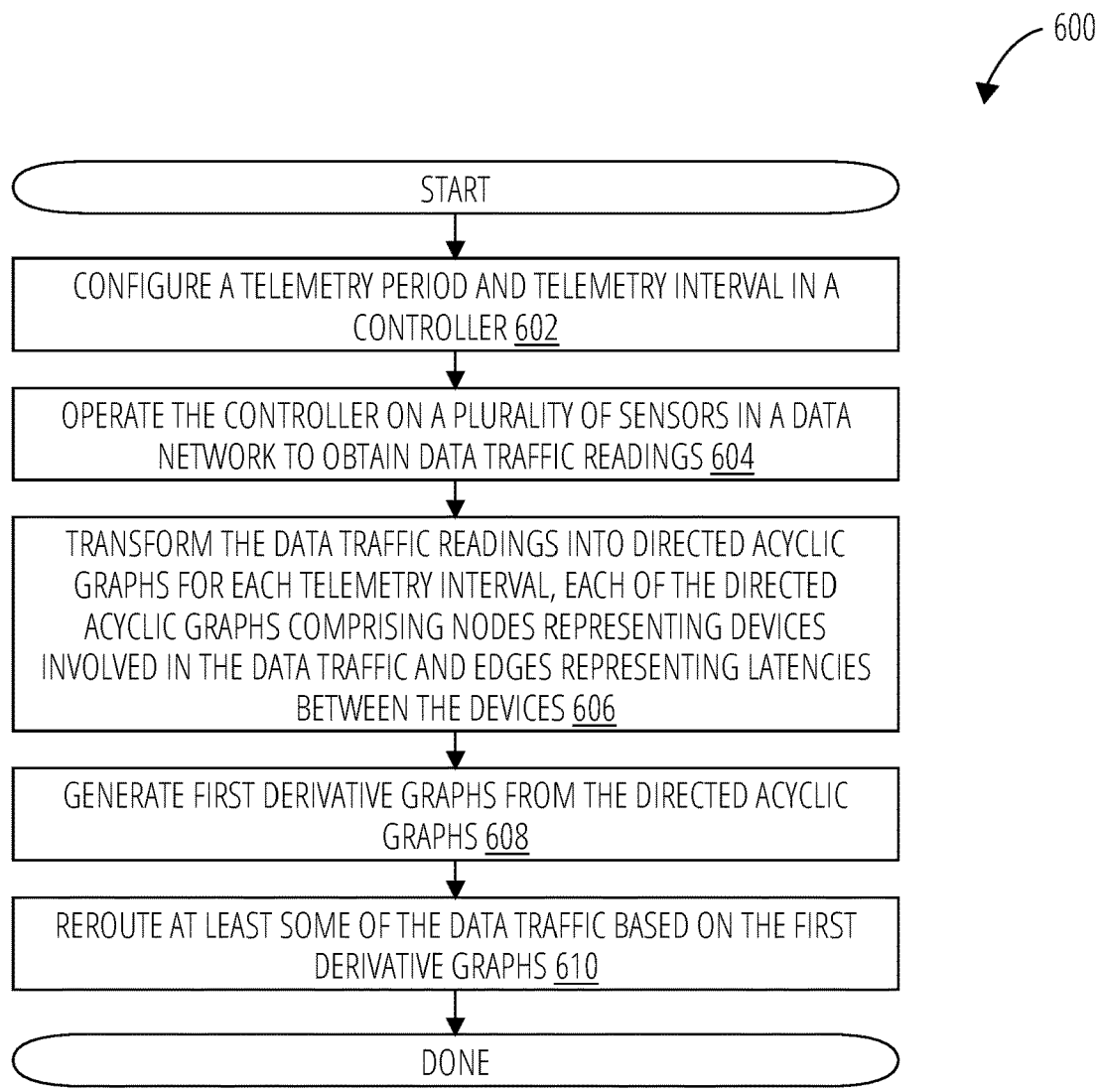
FIG. 6 depicts a network traffic routing process 600 in accordance with one embodiment.

FIG. 6 depicts a network traffic routing process 600 in one embodiment. At block 602, a telemetry period and telemetry interval are configured in a controller. At block 604, the controller is operated on a plurality of sensors in a data network to obtain data traffic readings. At block 606, the data traffic readings are transformed into directed acyclic graphs for each telemetry interval, each of the directed acyclic graphs including nodes representing devices involved in the data traffic and edges representing latencies between the devices. At block 608, first derivative graphs are generated from the directed acyclic graphs. At block 610, at least some of the data traffic is rerouted based on the first derivative graphs.

Machine Embodiments

Figure 7:
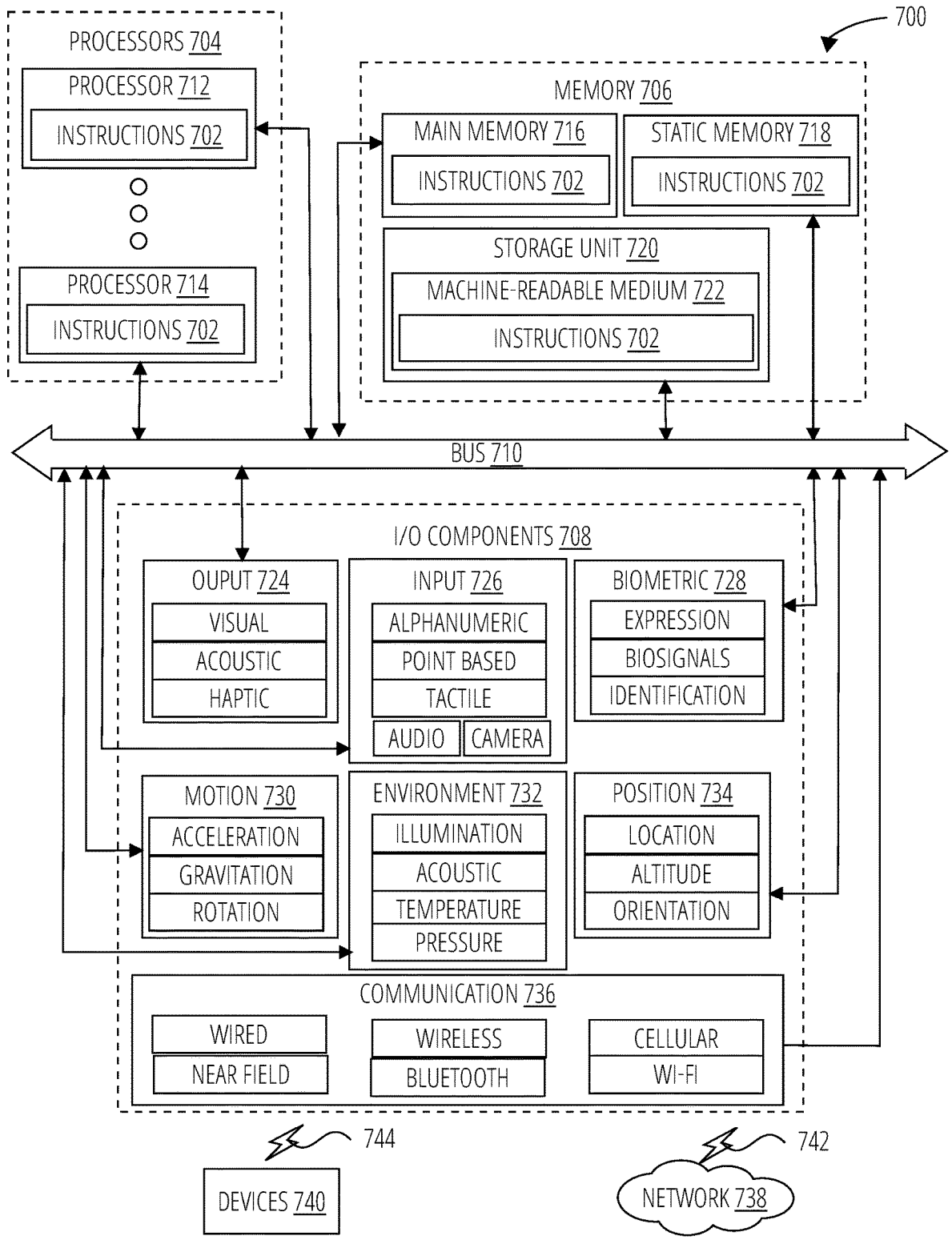
FIG. 7 is a diagrammatic representation of a machine 700 in the form of a computer system within which a set of instructions may be executed for causing the machine to perform any one or more of the methodologies discussed herein, according to an example embodiment.

FIG. 7 depicts a diagrammatic representation of a machine 700 in the form of a computer system within which logic may be implemented to cause the machine to perform any one or more of the functions or methods disclosed herein, according to an example embodiment.

Specifically, FIG. 7 depicts a machine 700 comprising instructions 702 (e.g., a program, an application, an applet, an app, or other executable code) for causing the machine 700 to perform any one or more of the functions or methods discussed herein. For example the instructions 702 may cause the machine 700 to perform one or more of the real-time telemetry (real-time telemetry controller 504), directed acyclic graph generation, first derivative graph generation, and application of the first derivative graphs to routing algorithms, in accordance with the disclosed techniques herein. The instructions 702 configure a general, non-programmed machine into a particular machine 700 programmed to carry out said functions and/or methods.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 702, sequentially or otherwise, that specify actions to be taken by the machine 700. Further, while only a single machine 700 is depicted, the term "machine" shall also be taken to include a collection of machines that individually or jointly execute the instructions 702 to perform any one or more of the methodologies or subsets thereof discussed herein.

The machine 700 may include processors 704, memory 706, and I/O components 708, which may be configured to communicate with each other such as via one or more bus 710. In an example embodiment, the processors 704 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 712 and processor 714) to execute the instructions 702. The term "processor" is intended to include multi-core processors that may comprise two or more independent processors (sometimes referred to as "cores") that may execute instructions contemporaneously. Although FIG. 7 depicts multiple processors 704, the machine 700 may include a single processor with a single core, a single processor with multiple cores (e.g., a multi-core processor), multiple processors with a single core, multiple processors with multiples cores, or any combination thereof.

The memory 706 may include one or more of a main memory 716, a static memory 718, and a storage unit 720, each accessible to the processors 704 such as via the bus 710. The main memory 716, the static memory 718, and storage unit 720 may be utilized, individually or in combination, to store the instructions 702 embodying any one or more of the functionality described herein. The instructions 702 may reside, completely or partially, within the main memory 716, within the static memory 718, within a machine-readable medium 722 within the storage unit 720, within at least one of the processors 704 (e.g., within the processor's cache memory), or any suitable combination thereof, during execution thereof by the machine 700.

The I/O components 708 may include a wide variety of components to receive input, provide output, produce output, transmit information, exchange information, capture measurements, and so on. The specific I/O components 708 that are included in a particular machine will depend on the type of machine. For example, portable machines such as mobile phones will likely include a touch input device or other such input mechanisms, while a headless server machine will likely not include such a touch input device. It will be appreciated that the I/O components 708 may include many other components that are not shown in FIG. 7. The I/O components 708 are grouped according to functionality merely for simplifying the following discussion and the grouping is in no way limiting. In various example embodiments, the I/O components 708 may include output components 724 and input components 726. The output components 724 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 708 may include biometric components 728, motion components 730, environmental components 732, or position components 734, among a wide array of possibilities. For example, the biometric components 728 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 730 may include acceleration sensor components (e.g., accelerometer), gravitation sensor components, rotation sensor components (e.g., gyroscope), and so forth. The environmental components 732 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 734 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 708 may include communication components 736 operable to couple the machine 700 to a network 738 or devices 740 via a coupling 742 and a coupling 744, respectively. For example, the communication components 736 may include a network interface component or another suitable device to interface with the network 738. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 740 may be another machine or any of a wide variety of peripheral devices (e.g., a peripheral device coupled via a USB).

Moreover, the communication components 736 may detect identifiers or include components operable to detect identifiers. For example, the communication components 736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 706, main memory 716, static memory 718, and/or memory of the processors 704) and/or storage unit 720 may store one or more sets of instructions and data structures (e.g., software) embodying or utilized by any one or more of the methodologies or functions described herein. These instructions (e.g., the instructions 702), when executed by processors 704, cause various operations to implement the disclosed embodiments.

As used herein, the terms "machine-storage medium," "device-storage medium," "computer-readable storage medium" and such mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

Communication Network Embodiments

In various example embodiments, one or more portions of the network 738 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 738 or a portion of the network 738 may include a wireless or cellular network, and the coupling 742 may be a Code Division Multiple Access (CDMA) connection, a Global System for Mobile communications (GSM) connection, or another type of cellular or wireless coupling. In this example, the coupling 742 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 702 and/or data generated by or received and processed by the instructions 702 may be transmitted or received over the network 738 using a transmission medium via a network interface device (e.g., a network interface component included in the communication components 736) and utilizing any one of a number of well-known transfer protocols (e.g., hypertext transfer protocol (HTTP)). Similarly, the instructions 702 may be transmitted or received using a transmission medium via the coupling 744 (e.g., a peer-to-peer coupling) to the devices 740. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 702 for execution by the machine 700, and/or data generated by execution of the instructions 702, and/or data to be operated on during execution of the instructions 702, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS 300 network architecture
302 private network
304 telecom network
306 user devices
308 media server
310 gateway
400 media content transmission process
402 upstream media source
404 voice-over-IP conference
406 media content
408 IP Unicast network
410 network routing application
412 media content
414 points-of-presence
416 IP Anycast network
418 unicast network
420 target media destination
422 conference participant
424 media content
426 media content
500 network analyzer system
502 IP Anycast network
504 real-time telemetry controller
506 gaming machine
508 gaming machine
510 game server
512 point-of-presence
514 point-of-presence
516 Internet Service Provider
518 Internet Service Provider
520 synthetic POP
522 synthetic server
524 data processor
526 router
528 directed acyclic graphs
530 first derivative graphs
600 network traffic routing process
602 block
604 block
606 block
608 block
610 block
700 machine
702 instructions
704 processors
706 memory
708 I/O components
710 bus
712 processor
714 processor
716 main memory
718 static memory
720 storage unit
722 machine-readable medium
724 output components
726 input components
728 biometric components
730 motion components
732 environmental components
734 position components
736 communication components
738 network
740 devices
742 coupling
744 coupling Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
   configuring a telemetry period and telemetry interval in a controller;
   operating the controller on a plurality of sensors in a data network to obtain data traffic readings;
   transforming the data traffic readings into directed acyclic graphs for each telemetry interval, each of the directed acyclic graphs comprising nodes representing devices involved in the data traffic and edges representing performance of path segments between the devices;
   generating first derivative graphs from the directed acyclic graphs; and
   rerouting at least some of the data traffic based on the first derivative graphs;
   wherein the performance for one or more of the path segments is determined according to $$P = \alpha \nabla_{lo} + \beta \nabla_{la} + \gamma S_{lo} + \delta S_{la}$$

where $\nabla_{lo}$ an $\nabla_{la}$ are instantaneous rates of change in loss and latency of a path segment, respectively, and where $S_{lo}$ and $S_{la}$ are path segment stability algorithms for loss and latency, respectively, and $\alpha$, $\beta$, $\gamma$, and $\delta$ are weighting factors.

2. The method of claim 1, wherein the directed acyclic graphs are generated from geoboundaries configured on the data network to overlap on the path segments with extant or historical high network traffic for a specific application.

3. The method of claim 1, wherein one of the directed acyclic graphs is generated for each of a set of user machines and a network server.

4. The method of claim 3, wherein the directed acyclic graphs comprise edges between the nodes, representing data traffic from the network server to a user machine or data traffic from the user machine to the network server.

5. The method of claim 1 wherein some of the devices are synthetic devices.

6. A network device comprising:
   sensors to obtain data traffic readings from a data network over a plurality of sampling intervals;
   logic to transform the data traffic readings into directed acyclic graphs for each of the intervals, each of the directed acyclic graphs comprising nodes representing devices involved in the data traffic and edges representing performance of path segments between the devices; and
   logic to generate first derivative graphs from the directed acyclic graphs and to rerouting at least some of the data traffic based on the first derivative graphs;
   wherein the performance for one or more of the path segments is determined according to $$P = \alpha \nabla_{lo} + \beta \nabla_{la} + \gamma S_{lo} + \delta S_{la}$$

where $\nabla_{lo}$ and $\nabla_{la}$ are instantaneous rates of change in loss and latency of a path segment, respectively, and where $s_{lo}$ and $s_{la}$ are path segment stability algorithms for loss and latency, respectively, and $\alpha$, $\beta$, $\gamma$, and $\delta$ are weighting factors.

7. The network device of claim 6, wherein the directed acyclic graphs are generated from geoboundaries configured on the data network to overlap on the path segments with extant or historical high network traffic for a specific application.

8. The network device of claim 6, wherein one of the directed acyclic graphs is generated for each of a set of user machines and a network server.

9. The network device of claim 8, wherein the directed acyclic graphs comprise edges between the nodes, representing data traffic from the network server to a user machine or data traffic from the user machine to the network server.

10. A non-transitory computer-readable storage medium, the computer-readable storage medium including instructions that when executed by a computer, cause the computer to:
    configure a telemetry period and telemetry interval in a controller;
    operate the controller on a plurality of sensors in a data network to obtain data traffic readings;
    transform the data traffic readings into directed acyclic graphs for each telemetry interval, each of the directed acyclic graphs comprising nodes representing devices involved in the data traffic and edges representing performance of path segments between the devices;
    generate first derivative graphs from the directed acyclic graphs; and
    reroute at least some of the data traffic based on the first derivative graphs;
    wherein the performance for one or more of the path segments is determined according to $$P = \alpha \nabla_{lo} + \beta \nabla_{la} + \gamma S_{lo} + \delta S_{la}$$

where $\nabla_{lo}$ and $\nabla_{la}$ are instantaneous rates of change in loss and latency of a path segment, respectively, and where $s_{lo}$ and $s_{la}$ are path segment stability algorithms for loss and latency, respectively, and $\alpha$, $\beta$, $\gamma$, and $\delta$ are weighting factors.

11. The computer-readable storage medium of claim 10, wherein the directed acyclic graphs are generated from geoboundaries configured on the data network to overlap on the path segments with extant or historical high network traffic for a specific application.

* * * * *